(12) United States Patent
Cotichini et al.

(10) Patent No.: US 7,996,413 B2
(45) Date of Patent: Aug. 9, 2011

(54) DATA MODERNIZATION SYSTEM FOR LEGACY SOFTWARE

(75) Inventors: Christian Cotichini, Vancouver (CA); Michael E. F. White, Vancouver (CA); David John Green, Surrey (CA)

(73) Assignee: MAKE Technologies, Inc., Vancouver (CA)

( * ) Notice: Subject to any disclaimer, the term of this patent is extended or adjusted under 35 U.S.C. 154(b) by 404 days.

(21) Appl. No.: 11/963,671

(22) Filed: Dec. 21, 2007

(65) Prior Publication Data

US 2009/0164491 A1  Jun. 25, 2009

(51) Int. Cl.
*G06F 7/00* (2006.01)
*G06F 17/30* (2006.01)
(52) U.S. Cl. ......... 707/756; 707/810; 707/755; 707/691
(58) Field of Classification Search .................. 707/810, 707/687, 691
See application file for complete search history.

(56) References Cited

U.S. PATENT DOCUMENTS

| | | | | |
|---|---|---|---|---|
| 5,708,828 | A * | 1/1998 | Coleman | 715/205 |
| 5,809,293 | A * | 9/1998 | Bridges et al. | 712/227 |
| 6,018,627 | A * | 1/2000 | Iyengar et al. | 717/103 |
| 6,587,857 | B1 * | 7/2003 | Carothers et al. | 1/1 |
| 7,010,501 | B1 * | 3/2006 | Roslak et al. | 705/26 |
| 7,185,317 | B2 * | 2/2007 | Fish et al. | 717/121 |
| 7,509,298 | B2 * | 3/2009 | Chandra et al. | 706/52 |
| 2002/0010912 | A1 * | 1/2002 | Kasvand et al. | 717/4 |

* cited by examiner

*Primary Examiner* — Kuen S Lu
*Assistant Examiner* — Susan F Rayyan
(74) *Attorney, Agent, or Firm* — Alleman Hall McCoy Russell & Tuttle LLP (57) ABSTRACT

A database modernization system and method is disclosed. One example embodiment comprises a method for receiving a record stored as a source physical data model, parsing the source physical data model into a source logical data model, wherein the source logical data model includes semantic information from the record, transforming the source logical data model to a destination logical data model independent of a source or a destination record physical implementation, wherein the destination logical data model includes at least a portion of the semantic information from the record, and storing the destination logical data model in a destination physical data model. In this manner, a destination physical data model may be stored in a relational database management system on a per record basis.

21 Claims, 5 Drawing Sheets

DATA MODERNIZATION SYSTEM FOR LEGACY SOFTWARE

TECHNICAL FIELD

The present invention relates generally to business systems and software, and more particularly to legacy data system modernization.

BACKGROUND

One of the greatest infrastructure challenges in organizations today is the reliance on database systems created and maintained over a period of time much longer than their anticipated lifespan. Many of these systems were created with numerous limitations and restrictions due to technological restraints of the time period. Over time, technology has rapidly improved and many of these systems have become outdated and inefficient. As a result, many organizations are looking for a viable approach to modernize their legacy database systems.

Past attempts at legacy database modernization have generally included direct software updates and/or conversions. One approach to legacy database modernization involves creating a new data store and uploading an entire legacy database into the new store in a single modernization attempt. One problem with this approach is that undetected flaws in the modernization software may result in unacceptable amounts of lost and/or destroyed data.

Another approach to legacy database modernization involves performing a record by record conversion of legacy source data into a new data store format. Although the occurrence of lost and/or destroyed data may be reduced, this approach may be both time-consuming and cost-prohibitive.

SUMMARY

According to one aspect of the invention, a database modernization system is provided that may include a data migration workbench transformer (DMWT) that transforms data records in a legacy source database and migrates them to a destination database. The DMWT may be configured with a rule set that describes the formats of both the source and destination database and ensures that records transformed/migrated to a destination database are of a specified format and content.

According to one embodiment, a database modernization method may include receiving a record stored as a source physical data model, parsing the source physical data model into a source logical data model, wherein the source logical data model includes semantic information from the record, transforming the source logical data model to a destination logical data model independent of a source or a destination record physical implementation, wherein the destination logical data model includes at least a portion of the semantic information from the record, and storing the destination logical data model in a destination physical data model. In this manner, a destination physical data model may be stored in a relational database management system on a per record basis.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF DRAWINGS

The disclosure is illustrated by way of example and not by way of limitation in the figures of the accompanying drawings, in which the like references indicate similar elements and in which.

DETAILED DESCRIPTION

Figure 1:
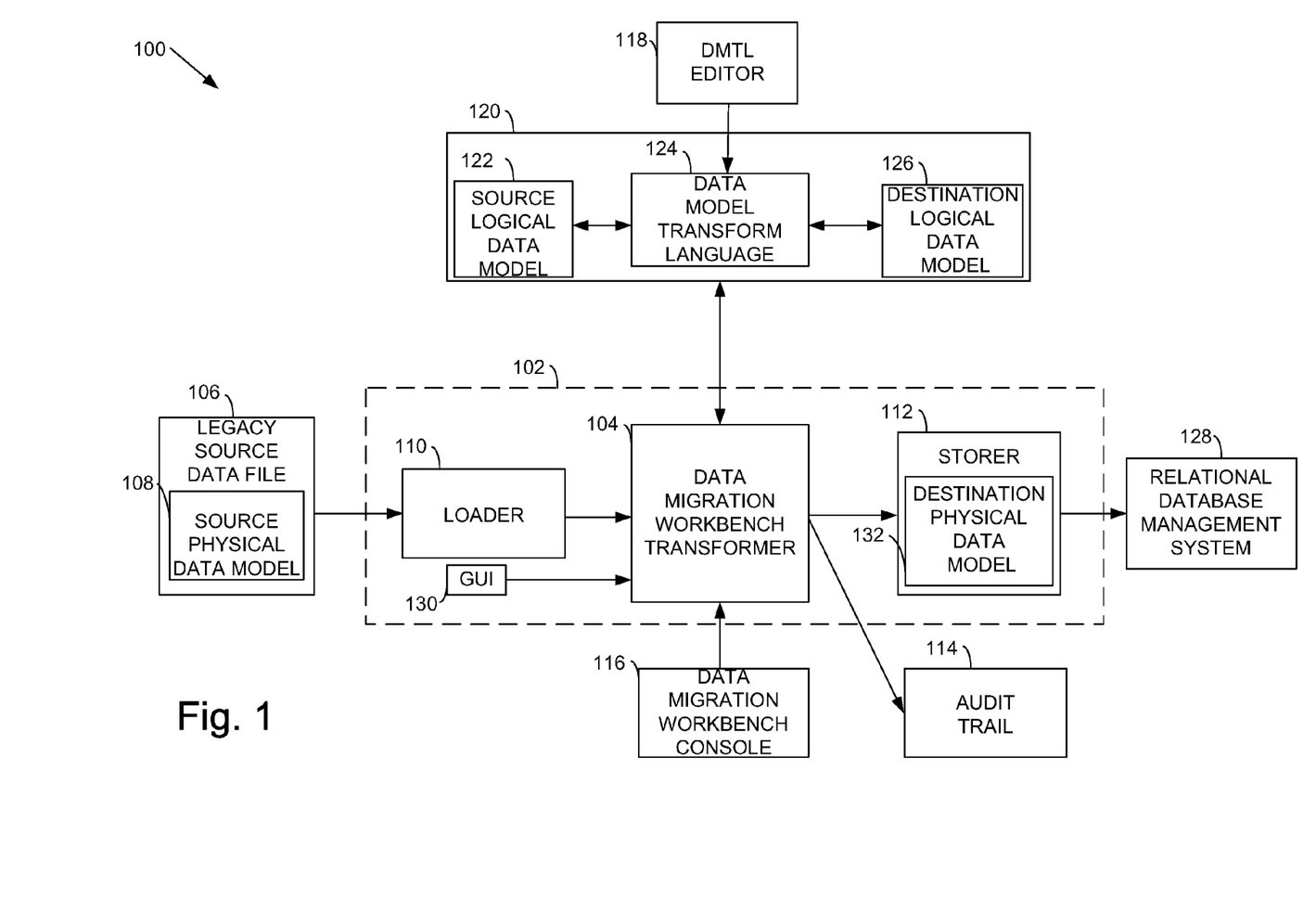
FIG. 1 is a schematic diagram of an exemplary embodiment of a data modernization system.

One exemplary embodiment of a data modernization system is schematically illustrated in FIG. 1. Data Modernization system 100 may include a legacy data source file 106 that encompasses a source physical data model 108 format. As a non-limiting example, legacy data source file 106 may be configured as a flat file export of a proprietary binary format. Source physical data model 108 may be configured as a lower-level representation of the physical data layout of legacy data source file 106, for example a physical data model 108 may be defined as a character with a length of 1 or as a string of length 20.

Data modernization system 100 may also include conversion engine 102. Conversion engine 102 may include loader 110, data migration workbench transformer (DMWT) 104, GUI 130 storer 112, and destination physical data model 132. Loader 110 may interface with legacy data source file 106 to parse the legacy data into an internal representation such as a document object model (DOM). In some embodiments, the legacy data may be a record that is parsed into an internal representation that conforms to a source logical data model 122 format. A logical data model provides semantic information more readily understood by a human user and therefore is not as implementation specific as the physical data model. Additionally, loader 110 may also validate source data 106 against source physical data model 108. Values that are not in conformance with the source physical data model may be deemed violations by DMWT 104 and subsequently logged as violations by audit trail 114. For example, dates might be stored in the source data as eight digit text strings such as YYYYMMDD. Thus, a non-eight digit string or a string that included a non-number symbol may be logged as one or more violations by audit trail 114. Audit trail 114 may be configured to log sets of distinct audit units created during a data modernization run. Each audit unit may contain a unique identifier that may be used to identify the source data record related to each audit unit. Storer 112 may be configured to translate data records received from DMWT 104 conforming to destination logical data model 126 and then pass them on to RDBMS 128. Like source physical data model 108, destination physical data model 132 may be configured as a low-level representation of the physical data layout of the target database (RDBMS 128).

Data modernization system 100 may also include logical data model interface 120, which may be configured as a module that represents the logical, abstracted referencing of the names used in legacy data source file 106 and a relational database management system 128. Logical data model interface 120 may in turn encompass source logical data model 122, destination logical data model 126, and data migration transform language (DMWTL) 124. DMWT 104 may access logical data model interface 120 to create a destination logical data model via DMWTL 124 that may be based in part on source logical data model 122. DMWTL 124 may utilize reference names included within source physical data model 108 and destination logical data model 126. Furthermore, DMWT 104 may read both the source and destination logical models and use them to validate legacy source data file 106. For example, entity and field names within data source 106 may be validated against both the source and destination logical models to ensure the accuracy of destination logical data model 126.

Data modernization system 100 may further include data model transform language (DMTL) editor 118 and data workbench migration console (DMWC) 116. DMWTL editor 118 may be a program accessed by a user via GUI 130 and logical data model interface 120 to update and modify a rule set (as described in further detail with regard to FIG. 2) embodied by DMWT 104 so as to improve the accuracy of the transformation/migration process of DMWT 104. DWMC 116 may provide a user real-time data via DMWT 104 and GUI 130 to assess the efficiency and performance of the data conversion process through data conversion engine 102 (e.g. number of records modernized per second, total violations, memory used, etc.).

Each data record that is successfully uploaded by loader 110 from legacy source data file 106 may then be processed by DMWT 104. A rule set (as described in further detail with regard to FIG. 2) within DMWT 104 may be applied to each data element (datum) to ensure that each data datum passed to storer 112 is of the data object format defined by source physical data model 108 and also concurs with destination physical data model 132 and destination logical data model 126. Once encapsulated as an instantiated data object by storer 112, data objects may then be stored in various relational database management systems 128, such as an Oracle® database management system, as one example.

Figure 2:
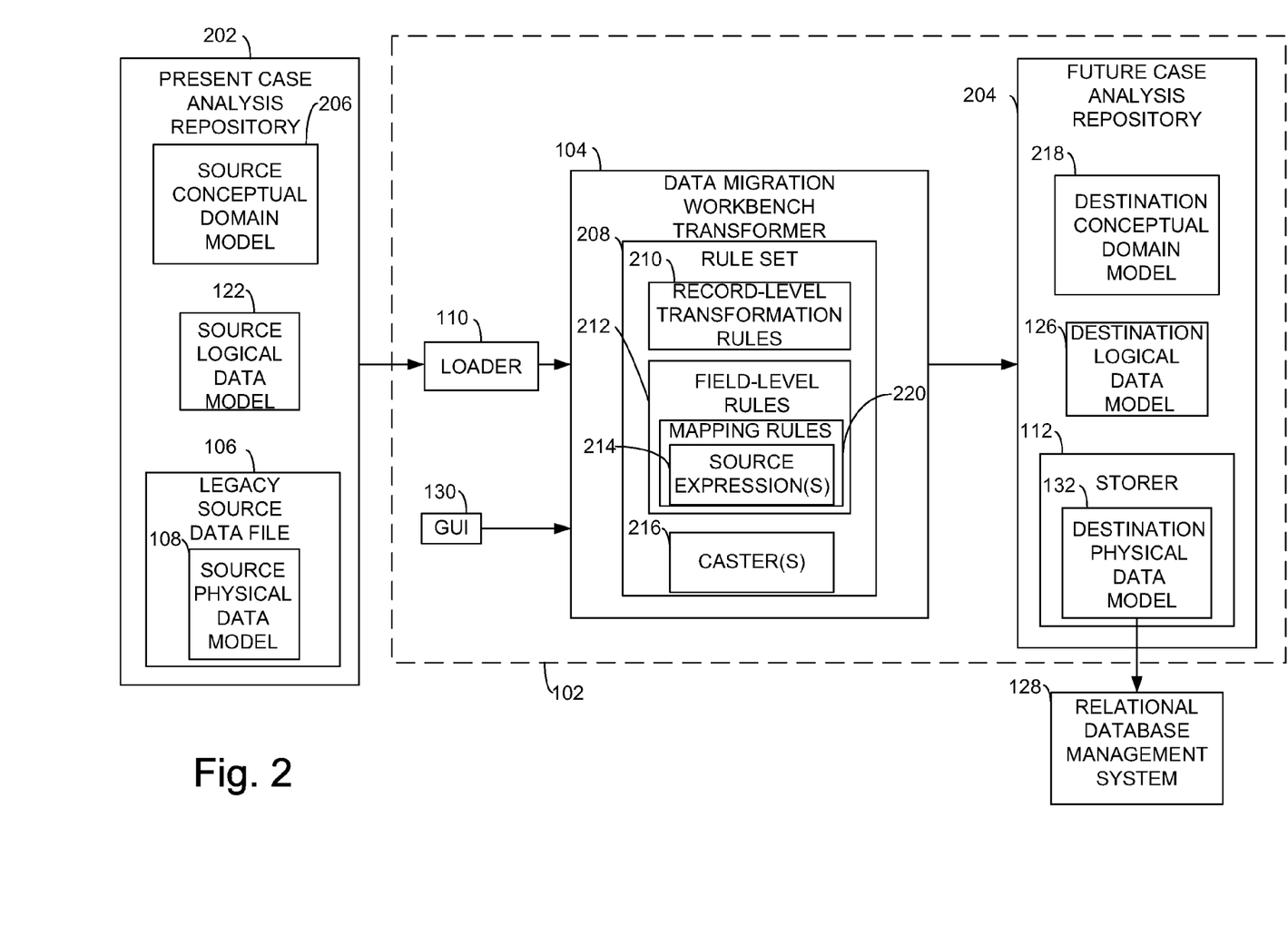
FIG. 2 is a schematic diagram of the data modernization system of FIG. 1 that depicts present case analysis and future case analysis repositories.

FIG. 2 is a schematic diagram of the data modernization system of FIG. 1 that depicts present case analysis and future case analysis repositories. Another representation of a data migration flow is depicted in FIG. 2. In this example, legacy source data may flow from present case analysis repository (PCAR) 202 through conversion engine 102 to RDBMS 128 via loader 110, DMWT 104, and future case analysis repository (FCAR) 204. PCAR 202 may include legacy source data file 106 which may be further defined by source physical data model 102. PCAR 202 may also include source logical data model 122 and source conceptual domain model 206 which may be mapped by a system programmer.

FCAR 204 may include destination conceptual domain model 216, destination logical data model 126, and storer 130 which may be further defined by destination physical data model 130. Destination conceptual domain model 218 and destination physical data model 132 may be mapped and defined by a system programmer. A relational database management system may access storer 112 within FCAR 204 to download data objects that have been stored within storer 112.

Each data element (datum) that is successfully uploaded by loader 110 from legacy source data file 106 may then be processed by DMWT 104. DMWT 104 may include rule set 208. Rule set 208 may be applied to a legacy data object to transform the legacy data object into a modern data object. A legacy data object may be a field, a data record, an arbitrarily defined set of data records, an entire database, or other individually transformable data object. Rule set 208 may include record-level transformation rule(s) 210, field level rule(s) 212, source expression(s) 214, and caster(s) 216 which may all be applied to the data records that are processed by DMWT 104. For example, record-level transformation rules may be rules that are applied to an entire data record and may include a rule that commands DMWT 104 to run all or a subset of the mapping rules in the transformer on the legacy source data. An example of a field-level rule may be a mapping rule 214 that copies a source logical field name within source logical data model 122 into a destination logical field name within destination logical model 126. A mapping rule may further include a source expression 214. A source expression may be defined as a further refinement of a mapping rule. For example, in a license plate data record, the presence of certain letters may indicate specific automobile registration information such as a commercially-owned or government-owned vehicle. In this example, a "G" might be used at the end of a license plate number data entity to indicate that the vehicle is a government owned vehicle. A source expression 214 may determine the presence of the letter "G" at the end of a license plate number data datum and produce a Boolean value based on the presence of the letter (or lack thereof) that may be stored in storer 112.

Another example of DMWT 104 utilizing mapping rules 210, is the creation of surrogate keys within storer 112, each of which indirectly references a natural key of a single data datum in legacy source data file 106. Furthermore, a mapping rule may create a foreign key that is a reference between two related data objects within storer 112. Another example of a DMWT mapping rule may be a rule that establishes a unique key for the natural key of each data datum in legacy source data file 106. A unique key may require that each natural key of a data datum be a singular key unto itself. In other words, the creation of a unique key ensures that duplicate legacy source data file datums will not be passed on to storer 112 and duplicates may be recorded in audit trail 114 as violations.

Additionally, rule set 208 may include a caster(s), which may be a script or piece of compiled code that may validate and transform a single typed datum to an output field. For example, a default caster may simply validate that the datum can represent a number (e.g. a caster of this type would be utilized when transforming a number in legacy data source file 106 to a number in storer 112). A more complex caster may do project-specific work such as extract the "year" component from a complex binary field that was used to store sequence numbers for assigning numbers to, for example, birth and death certificates.

After the transforming and migration of a pre-determined number of source data records through DMWT 104 (by applying rule set 208 to each data record) is complete, a number of destination records may have been formed and passed on to storer 112. Consequently, RDBMS 128 may then be populated with data object records. Unique keys and surrogate keys are valid for all data object records at this point; however, some foreign keys generated by DMWT 104 from natural key relationships in legacy source data file 106 may be invalid. DMWT 104 may then perform a referential integrity validation between legacy source data file 106 and the target database stored within RDBMS 128 (as described in further detail with regard to FIG. 4).

Figure 3:
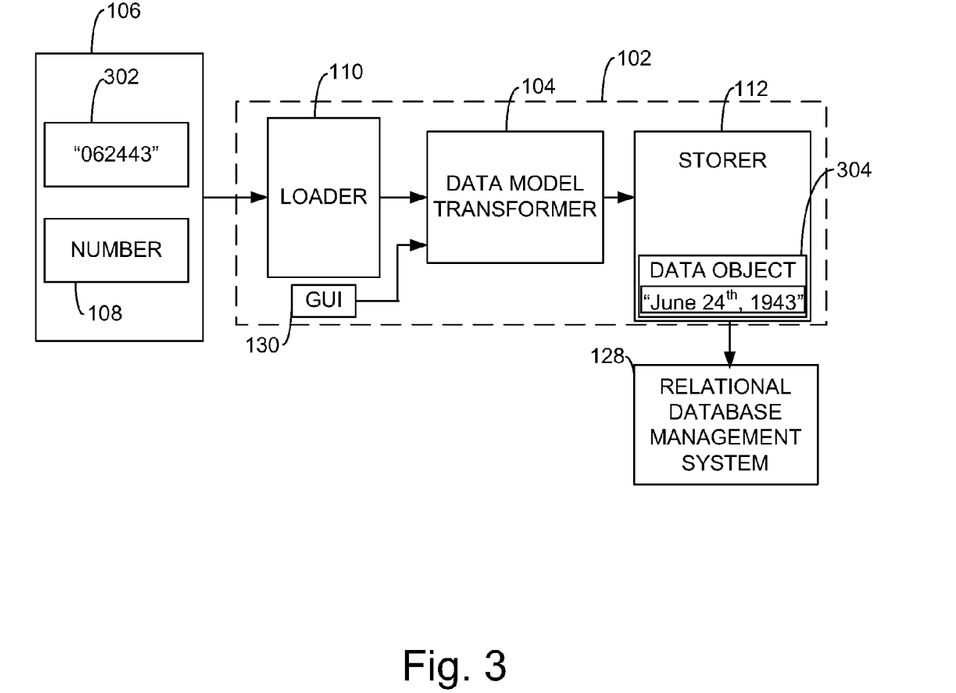
FIG. 3 is a schematic diagram of an example data migration/transformation through the data modernization system of FIG. 1.

Turning now to FIG. 3, which illustrates a schematic diagram of an example data migration through the data modernization system of FIG. 1, a data datum 302 that represents a six-digit value is stored within legacy data source file 106 along with the physical data model 108 that represents the specific data datum as a date to DMWT 104. After the data datum is uploaded and processed by loader 110 and subsequently transformed by DMWT 104 within conversion engine 102, a data object 304 may be instantiated with the transformed data datum. The instantiated data object 304, stored by storer 112, may now be accessed by a relational database management system (RDBMS) 128 and instantiated with other data, such as additional data datums contained within the original data record that was transformed and migrated, if desired.

Figure 4:
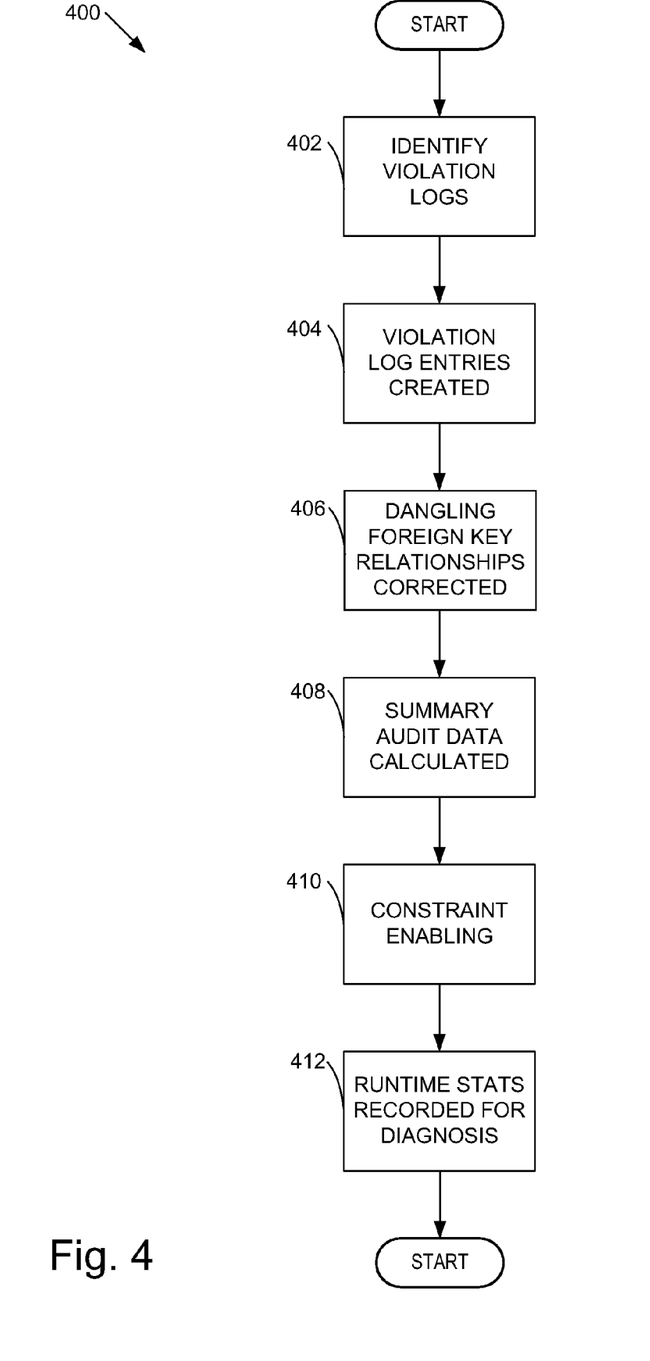
FIG. 4 shows a flow chart depicting an example data referential integrity validation/correction/reporting process for the modernization system of FIG. 1.

FIG. 4 shows a flow chart depicting a data referential integrity validation/correction/reporting process for the modernization system of FIG. 1. After the transforming and migration of a pre-determined number of source data records through DMWT 104 (by applying rule set 208 to each data record) is complete, a number of destination data object records may have been formed and passed on to storer 112. At this point, RDBMS 128 is populated with destination data object records. Primary and unique keys are valid for all source data object records at this point, however, some foreign key field values generated by DMWT 104 from natural key relationships in legacy source data file 106 may be invalid.

At 402, transforming violation logs may be identified by DMWT 104. An example of a violation log type may include a null field violation log where a source field in legacy data source file 106 is empty and a constraint in DMWT 104 and/or destination logical data model 126 is violated. At 404, this type of violation log will be entered into audit trail 114.

Another example of a violation log type may include a typecast error violation log where a field in legacy data source file 106 has failed to satisfy the logical constraints of a caster 216 within DMWT 104 that was utilized in a failed attempt to transform the corresponding data datum. At 404, this type of violation log will be entered into audit trail 114. Another example of a violation log type may include a parse error where loader 110 has failed to parse a particular data datum from legacy data source file 106. At 404, this type of violation log may be entered into audit trail 114.

Another example of a violation log type may include a duplicate natural key where a natural key used to generate primary surrogate keys occurs more than once in the legacy data source file. When DMWT 104 first encounters a natural key it will successfully generate a surrogate key. Subsequent occurrences of a specific natural key may generate a violation log of this type that may be entered into audit trail 114.

Another example of a violation log type may include a foreign key violation where surrogate keys were generated by DMWT 104 from natural key relationships in the legacy source data file 106. In other words, a foreign key may have been generated that does not point to an existing data datum in the legacy source data file. This is often referred to as a "dangling" foreign key. At 404, DMWT 104 may run queries on target RDBMS 128 to find dangling foreign key relationships. Additionally, at 404, DMWT 104 may produce dangling foreign key violation log entries and enter them into audit trail 114. The foreign key violation log entries may include the unique key of the specific data datum, the present case analysis repository natural key value of the specific data datum, and the surrogate key of the destination data object record, for example.

Since modern database systems may require referential integrity constraints to be present and active, referential integrity violations such as dangling foreign keys may need to be corrected by DMWT 104 at 406. By requiring loader 110 to only load complete records to DMWT 104 and requiring DMWT 104 to remove or rewrite source data datums related to dangling foreign keys in legacy data source file 106, conversion engine 102 ensures overall record atomicity between a legacy database and a destination database. In other words, the DMWT only transforms/migrates complete source data datums to a destination database whereas incomplete or defective source data datums are not transformed/migrated to the destination database. Thus, only complete source data records that agree with both its corresponding source and destination logical data models are allowed to be migrated/transformed to the destination database. Furthermore, any given source data datum has either been transformed/migrated to storer 112 with a corresponding full set of log entries reported to audit trail 114 that indicate which rules within DMWT 104 were ran by DMWT 104 or there is a full set of log entries reported to audit trail 114 that indicate why specific data records were rejected for transformation/migration.

At 408, summary data for auditing may be calculated. For example, queries against audit trail 114 may be executed and the results may be stored in a metadata table for retrieval by a DMWT user. At 410, remaining constraints such as primary key, foreign key, and unique key constraints are enabled by DMWT 104. At this point, however, the referential integrity validation, logging, and correction step has already been run and thus unique natural keys have been verified by the unique constraint(s) enforced by DMWT 104. Therefore, any constraint validation errors at this point typically are fatal and are reported to audit trail 114 as such.

At 412, several runtime statistics may be reported to audit trail 114 and data workbench migration console 116. Some of these runtime statistics may include, key index performance (cache hits, disk reads, disk writes, for example), loader efficiency (blocked time, for example), log messages (info, warning, error, for example), referential integrity results (dangling foreign keys, source data records removed, foreign keys replaced by null, for example). These statistics may be used by a DMWT user to diagnose problems associated with and assess the efficiency and quality of a data migration/transformation run.

By using the statistics to evaluate the overall performance of DMWT 104, a DMWT user may continuously integrate improvements into conversion engine 102. For example, modifications may be made to rule set 208 and/or the destination logical data model 126 of future case analysis repository 204 to improve the efficiency or accuracy of the migration and transformation of data from PCAR 202 to FCAR 204. More specifically, a mapping rule 220, caster 216, or source expression 214 may be rewritten to be more constrained or more lenient so as to produce a desired migration/transformation outcome.

This rule-by-rule cleansing allows DMWT 104 to be continuously and incrementally improved in an iterative manner that allows for small portions of legacy source data to be processed by the DMWT prior to a migration/transformation of the entire legacy source data file 106. This results in a user of conversion engine 102 to have the ability to have demonstrated successful data migration/transformation prior to subjecting an entire legacy data source to a modernization process that might result in the loss or destruction of source data.

The portion of legacy source data that was processed during the previous data transformation/migration run performed by DMWT 104 (and produced unique runtime statistics which formed the basis for the aforementioned modifications/improvements to conversion engine 102) may then be re-processed by DMWT 104. An iterative conversion engine improvement process may thus be instituted by a user of DMWT 104 that results in an iterative cycle of data transformation/conversion engine improvement until the performance of the data migration/transformation process is deemed to be at a satisfactory level by a DMWT user. A full data migration/transformation of the entire legacy source data file may then be executed.

Figure 5:
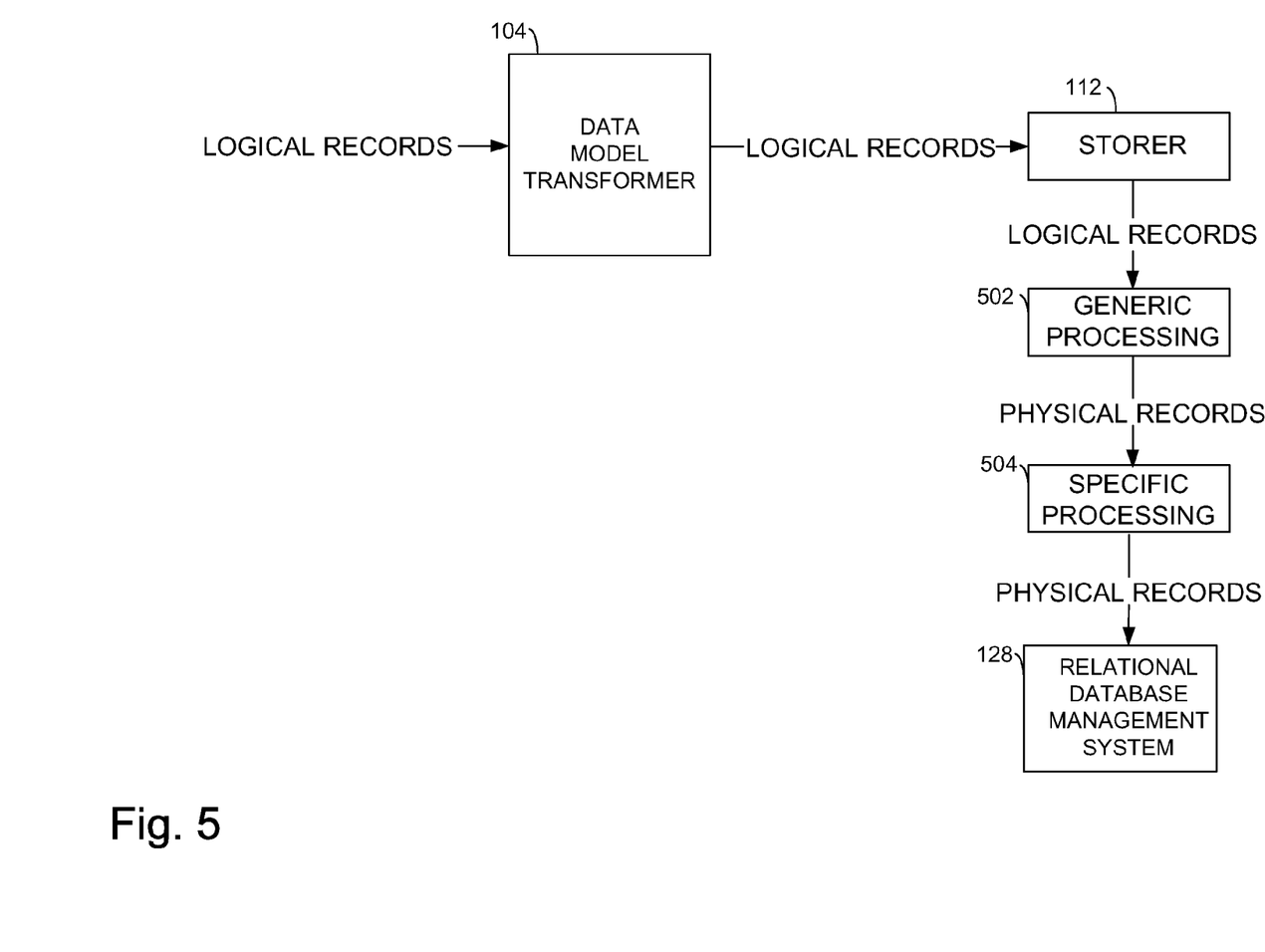
FIG. 5 shows a flow chart depicting the processing of records through the modernization system of FIG. 1.

FIG. 5 shows a flow chart depicting the processing of records through the modernization system of FIG. 1. After logical records are processed by DMWT 104 and stored by storer 112, they may be generically processed at 502. This generic processing may include preparing physical records that will be sent on to a generic relational database management system. Certain processing actions may be performed at 502 that prepare the physical records for any number of relational database management systems. In other words, the processing done at 502 is not for a specific RDBMS, but instead includes processing steps that may prepare physical records for specific processing at 504. At 504, record processing steps specific to an individual RDBMS, such as Oracle®, may be performed. The physical records may then be accessed by multiple relational database management systems 128 or another type of storage implementation such as comma separated text files. This may be accomplished, for example, by multiplexing these various storage implementations.

It should be understood that the described steps may graphically represent code to be programmed into a non-transitory computer readable storage medium. It should be further understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A database modernization method, comprising:
receiving a record stored as a source physical data model;
parsing the source physical data model into a source logical data model based on a rule set, wherein the source logical data model includes semantic information from the record;
transforming the source logical data model to a destination logical data model independent of a source or a destination record physical implementation based on the rule set, wherein the destination logical data model includes at least a portion of the semantic information from the record;
storing the destination logical data model in a destination physical data model, wherein the destination physical data model is stored in a relational database management system on a per record basis;
if transforming of the source logical data model to the destination logical data model is successful, then validating database modernization in an audit log; and
if transformation of the source logical data model to the destination logical data model is unsuccessful, then:
invalidating database modernization in the audit log, correcting referential integrity violations,
reporting a plurality of runtime statistics, the plurality of runtime statistics including at least the audit log,
re-processing the record after the rule set has been adjusted, and
adjusting the rule set to improve subsequent database modernization based on the plurality of runtime statistics.

2. The database modernization method of claim 1, wherein invalidating further comprises storing at least one violation if the record could not be modernized, wherein the at least one violation prevented the record from being modernized.

3. The database modernization method of claim 1, further comprising storing a unique identifier in the source logical data model.

4. The database modernization method of claim 3, wherein validating further comprises attaching the unique identifier to the record and creating a success log entry if the record was successfully modernized, wherein the log entry includes the unique identifier.

5. The database modernization method of claim 3, wherein invalidating further comprises attaching the unique identifier to the record and creating a violation log entry if the record was not successfully modernized, wherein the violation log entry includes the unique identifier and a violation log type.

6. The database modernization method of claim 1, further comprising transforming multiple distinct sets of data in the record from the source logical data model to the destination logical data model at the same time.

7. The database modernization method of claim 6, wherein a first distinct set of data is a first field in the record, and a second distinct set of data is a second field in the record.

8. A non-transitory computer-readable medium comprising computer-executable instructions for modernizing a database, the instructions being executable by a modernization system to:
receive a record stored as a source physical data model;
parse the source physical data model into a source logical data model, wherein the source logical data model includes semantic information from the record;
transform the source logical data model to a destination logical data model independent of a source or a destination record physical implementation, wherein the destination logical data model includes at least a portion of the semantic information from the record;
store the destination logical data model in a destination physical data model, wherein the destination physical data model is stored in a relational database management system on a per record basis;
if database modernization is successful, then validate database modernization in an audit log; and
if database modernization is unsuccessful, then:
invalidate database modernization in the audit log, correct referential integrity violations,
report a plurality of runtime statistics, the plurality of runtime statistics including at least the audit log,
re-process the record after the rule set has been adjusted, and
receive instructions to adjust the rule set to improve subsequent database modernization based on the plurality of runtime statistics.

9. The non-transitory computer-readable medium of claim 8, further comprising instructions executable to invalidate database modernization by storing at least one violation if the record could not be modernized, wherein the at least one violation prevented the record from being modernized.

10. The non-transitory computer-readable medium of claim 8, further comprising instructions executable to store a unique identifier in the source logical data model.

11. The non-transitory computer-readable medium of claim 10, further comprising instructions executable to validate database modernization by attaching the unique identifier to the record and creating a success log entry if the record was successfully modernized, wherein the success log entry includes the unique identifier.

12. The non-transitory computer-readable medium of claim 10, further comprising instructions executable to invalidate database modernization by attaching the unique identifier to the record and creating a violation log entry if the record was not successfully modernized, wherein the violation log entry includes the unique identifier and a violation log type.

13. The non-transitory computer-readable medium of claim 8, further comprising instructions executable to transform multiple distinct sets of data in the record from the source logical data model to the destination logical data model at the same time.

14. The non-transitory computer-readable medium of claim 13, wherein a first distinct set of data is a first field in the record, and a second distinct set of data is a second field in the record.

15. A database modernization system, comprising:
a computer processor;
a loader to receive a record stored as a source physical data model, and to parse the source physical data model into a source logical data model,
wherein the source logical data model includes semantic information from the record;
a transformer coupled to the loader, the transformer to receive the source logical data model from the loader, wherein the transformer is configured to:
    transform the source logical data model to a destination logical data model independent of a source or a destination record physical implementation,
    wherein the destination logical data model includes at least a portion of the semantic information from the record,
    if database modernization is successful,
        then validate database modernization in an audit log, and
    if database modernization is unsuccessful, then:
        invalidate database modernization in the audit log,
        correct referential integrity violations,
        report a plurality of runtime statistics, the plurality of runtime statistics including at least the audit log,
        receive instructions to adjust the rule set to improve subsequent database modernization based on the plurality of runtime statistics, and
        re-process the record after the rule set has been adjusted; and
a storer coupled with the transformer, the storer to receive the destination logical data model from the transformer and configured to store the destination logical data model in a destination physical data model in a relational database management system on a per record basis.

16. The database modernization system of claim 15, wherein the transformer is further configured to invalidate database modernization by storing at least one violation if the record could not be modernized, wherein the at least one violation prevented the record from being modernized.

17. The database modernization system of claim 15, wherein the loader is further configured to store a unique identifier in the source logical data model.

18. The database modernization system of claim 17, wherein the transformer is further configured to validate database modernization by attaching the unique identifier to the record and creating a success log entry if the record was successfully modernized, wherein the success log entry includes the unique identifier.

19. The database modernization system of claim 17, wherein the transformer is further configured to invalidate database modernization by attaching the unique identifier to the record and creating a violation log entry if the record was not successfully modernized, wherein the violation log entry includes the unique identifier and a violation log type.

20. The database modernization system of claim 15, wherein the transformer is further configured to transform multiple distinct sets of data in the record from the source logical data model to the destination logical data model at the same time.

21. The database modernization system of claim 20, wherein a first distinct set of data is a first field in the record, and a second distinct set of data is a second field in the record.

* * * * *